(12) United States Patent
Mandyam et al.

(10) Patent No.: US 9,756,452 B2
(45) Date of Patent: Sep. 5, 2017

(54) PRESENCE AND ON-DEVICE PROXYING

(71) Applicant: QUALCOMM Incorporated, San Diego, CA (US)

(72) Inventors: Giridhar Dhati Mandyam, San Diego, CA (US); Arungundram Chandrasekaran Mahendran, San Diego, CA (US); Srinivasan Balasubramanian, San Diego, CA (US); Ramachandran Subramanian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 281 days.

(21) Appl. No.: 14/162,480

(22) Filed: Jan. 23, 2014

(65) Prior Publication Data
US 2015/0081769 A1    Mar. 19, 2015

Related U.S. Application Data

(60) Provisional application No. 61/878,543, filed on Sep. 16, 2013.

(51) Int. Cl.
*G06F 15/16* (2006.01)
*H04W 4/00* (2009.01)
(Continued)

(52) U.S. Cl.
CPC ......... *H04W 4/005* (2013.01); *H04L 65/1069* (2013.01); *H04L 65/608* (2013.01);
(Continued)

(58) Field of Classification Search
CPC ... H04L 65/403; H04L 65/1069; H04L 65/15; H04L 65/1073; H04L 65/1016;
(Continued)

(56) References Cited

U.S. PATENT DOCUMENTS

| 7,698,386 | B2 | 4/2010 | Amidon et al. |
| 7,774,495 | B2 | 8/2010 | Pabla et al. |

(Continued)

FOREIGN PATENT DOCUMENTS

| WO | WO-2005015935 A1 | 2/2005 |
| WO | WO-2005094108 A1 | 10/2005 |
| WO | WO-2012038445 A1 | 3/2012 |

OTHER PUBLICATIONS

International Search Report and Written Opinion—PCT/US2014/055690—ISA/EPO—Dec. 19, 2014.
(Continued)

*Primary Examiner* — David Lazaro
(74) *Attorney, Agent, or Firm* — Haynes and Boone, LLP (57) ABSTRACT

An example method of facilitating communication between a mobile device and a target peer includes receiving, at a proxy executing on a mobile device, a communication to initiate a real-time communication connection with a target peer. The method also includes determining one or more capabilities of the target peer. The method further includes initiating a session with the target peer, where the session is based on the one or more determined capabilities of the target peer.

21 Claims, 7 Drawing Sheets

(51) Int. Cl.
*H04W 48/18* (2009.01)
*H04W 88/02* (2009.01)
*H04L 29/06* (2006.01)
*H04L 29/08* (2006.01)

(52) U.S. Cl.
CPC .............. *H04L 67/02* (2013.01); *H04L 69/24* (2013.01); *H04W 48/18* (2013.01); *H04W 88/02* (2013.01)

(58) Field of Classification Search
CPC . H04L 67/141; H04L 65/608; H04L 12/5692; H04L 65/1066; H04W 88/02; H04W 48/18; H04W 88/06; H04W 36/0066; H04W 4/005; H04W 60/00
See application file for complete search history.

(56) References Cited

U.S. PATENT DOCUMENTS

| | | | | |
|---|---|---|---|---|
| 8,442,526 B1* | 5/2013 | Bertz | .................. | H04L 65/1016 455/433 |
| 2005/0229243 A1 | 10/2005 | Svendsen et al. | | |
| 2010/0182995 A1 | 7/2010 | Hwang et al. | | |
| 2011/0016184 A1* | 1/2011 | Wen | .................... | G06F 9/44526 709/206 |
| 2011/0314140 A1* | 12/2011 | Stille | ....................... | H04L 69/24 709/223 |
| 2012/0066495 A1* | 3/2012 | Hao | ...................... | H04L 9/0827 713/168 |
| 2012/0128147 A1 | 5/2012 | Callanan et al. | | |
| 2013/0331054 A1* | 12/2013 | Kodali | .................. | H04W 36/14 455/404.1 |
| 2014/0235205 A1* | 8/2014 | Paluch | .................. | H04W 12/06 455/411 |
| 2015/0039687 A1* | 2/2015 | Waxman | ................. | H04L 67/02 709/204 |
| 2015/0139197 A1* | 5/2015 | He | ...................... | H04W 76/048 370/336 |

OTHER PUBLICATIONS

Jennings N-C., et al.,"SDP for the WebRTC; draft-nandakumar-rtcweb-sdp-00.txt", SDP for the WEBRTC; Draft-Nandakumar-RTCWEB-SDP-00.Txt, Internet Engineering Task Force, IETF; Standardworkingdraft, Internet Society (ISOC) 4, Rue Des Falaises CH-1205 Geneva, Switzerland, Oct. 15, 2012 (Oct. 15, 2012), pp. 1-35, XP015087907, [retrieved on Oct. 15, 2012].

Jennings U-C., et al., "Javascript Session Establishment Protocol; draft-ietf-rtcweb-jsep-01.txt", Javascript Session Establishment Protocol; Draft-IETF-RTCWEB-JSEP-01.Txt, Internet Engineering Task Force, IETF; Standardworkingdraft, Internet Society (ISOC) 4, Rue Des Falaises CH-1205 Geneva, Switzerland, Jun. 5, 2012 (Jun. 5, 2012), pp. 1-31, XP015083173, [retrieved on Jun. 5, 2012].

Packet K-A., et al., "Requirements for Interworking WebRTC with Current SIP Deployments; draft-kaplan-rtcweb-sip-interworking-requirements-01.txt",Requirements for Interworking WEBRTC With Current SIP Deployments; Draft-Kaplan-RTCWEB-SIP-Interworking-Requirements-01.Txt, Internet Engineering Task Force, IETF; Standardworkingdraft, Internet Society (ISOC) 4, Rue Des Falaises CH-1205 Geneva, Swi, Nov. 1, 2011 (Nov. 1, 2011), pp. 1-22, XP015079332, [retrieved on Nov. 1, 2011].

* cited by examiner

PRESENCE AND ON-DEVICE PROXYING

CROSS REFERENCE TO RELATED APPLICATIONS

This application claims the benefit of priority from U.S. Provisional Patent Application No. 61/878,543, filed Sep. 16, 2013, which is incorporated by reference.

FIELD OF DISCLOSURE

The present disclosure generally relates to network communications, and more particularly to network communications at a mobile device.

BACKGROUND

WebRTC (Web Real-Time Communications) is an open project that aims to add real-time communications capabilities to Web browsers via a JavaScript Application Programming Interface (API). WebRTC offers web application developers the ability to write rich, real-time multimedia applications on the Web, without requiring plugins, downloads, or installs. For example, WebRTC may enable peer-to-peer real-time communication between browser-based applications regardless of the relative location of the target peers (e.g., on the same device, in the same private network, both behind distinct firewalls, etc.).

BRIEF SUMMARY

This disclosure relates to network communications. Methods, systems, and techniques for facilitating communication for a mobile device are provided.

According to some embodiments, a method of facilitating communication between a mobile device includes receiving, at a proxy executing on a mobile device, a communication to initiate a real-time communication connection with a target peer. The method also includes determining one or more capabilities of the target peer. The method further includes initiating a session with the target peer, the session being based on the one or more determined capabilities of the target peer.

According to some embodiments, a system for facilitating communication between a mobile device and a target peer includes a communication module and a capability module executable on a mobile device. The communication module receives a communication to initiate a real-time communication connection with a target peer. The capability module determines one or more capabilities of the target peer and initiates a session with the target peer. The session is based on the one or more determined capabilities of the target peer.

According to some embodiments, a computer-readable medium has stored thereon computer-executable instructions for performing operations including receiving, at a proxy executing on a mobile device, a communication to initiate a real-time communication connection with a target peer; determining one or more capabilities of the target peer; and initiating a session with the target peer, the session being based on the one or more determined capabilities of the target peer.

According to some embodiments, an apparatus for facilitating communication between a mobile device and a target peer includes means for receiving a communication to initiate a real-time communication connection with a target peer; means for determining one or more capabilities of the target peer; and means for initiating a session with the target peer, the session being based on the one or more determined capabilities of the target peer.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIG. 8 is a block diagram illustrating a wireless device including a digital signal processor, according to some embodiments.

DETAILED DESCRIPTION

I. Overview
II. Example System Architectures
III. Examples of Leveraging Presence
 A. Peer Availability
 B. Peer Capability Detection
 C. Session Configuration
IV. Presence Server
V. Example Method
VI. Example Wireless Device

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The WebRTC technology enables web developers to establish real-time communications in a peer-to-peer sense between web browsers. WebRTC is an application that provides two-way real-time communications capability between two peers. In an example, WebRTC provides real-time peer-to-peer communications in a browser. Although the WebRTC standards provide for browser and API requirements, signaling for session negotiation and capability discovery between peers may be left to the application. The WebRTC standard as currently defined does not leverage any other mechanisms that can provide information regarding the capabilities of peers during session setup. Accordingly, WebRTC sessions may require additional messaging between peers during session initiation where the peers agree upon session parameters.

The Third Generation Partnership Project (3GPP) has initiated a work item to examiner WebRTC interoperability with the IP Multimedia Subsystem (IMS). In 3GPP-defined networks, the IMS forms the core network offering. WebRTC may be interoperable with the IMS core network. In an example, IMS interoperability may be achieved by providing new core network elements that provide hosting of the WebRTC application (e.g., a web page), a signaling server to mediate communication between peers and translate client signaling over a browser-compatible transport (e.g., HTTP-based) to an IMS-friendly SIP (Session Initial Protocol) transport, and a transcoding media gateway that accounts for different coder and/or decoder (codec) usage among peers. In another example, IMS interoperability may be achieved by using an on-device proxy that communicates directly with the IMS network for call setup. An advantage of such an example may avoid investing in IMS core network additions simply for WebRTC services.

Moreover, IMS may be accompanied by a client-side solution for access to IMS-based services such as telephony through the Rich Communications Suite (RCS). An enabler for RCS services is presence. Presence solutions are typically used for services such as instant messaging, where it is important for a user to know the status of the presence client of other users in order to facilitate peer-to-peer interaction. In RCS, IMS-compatible presence solutions may be used by peers to discover the capabilities of each other. In an example, RCS leverages the Open Mobile Alliance (OMA) Simple Presence standard. OMA Simple Presence uses a presence server to maintain accurate information about all peers (e.g., capabilities and registration status), which can result in significant over-the-air traffic. In another example, RCS allows deployment without OMA Simple Presence. In such an example, SIP messaging may be used (e.g., SIP Options sent end-to-end to query a peer's capabilities). An on-device WebRTC proxy can leverage RCS-presence mechanisms as part of a session set up and maintenance. This may improve WebRTC quality of experience.

The present disclosure provides techniques for using a proxy that provides interoperability functionality for a browser-based WebRTC implementation to enable improved session negotiation. Based on the proxy leveraging existing presence services, the proxy may determine peer availability, peer capabilities (e.g., whether the target peer has currently opened in its browser a proxy-enabled WebRTC webpage), and peer capabilities without real-time message exchange based on cached information.

For brevity, the disclosure may describe, for example, WebRTC as being the technology that enables real-time communication between applications and SIP as being the signaling communications protocol used between the peers, but this is not intended to be limiting and it should be understood that other technologies that provide these capabilities are within the scope of the disclosure.

II. Example System Architectures

Figure 1:
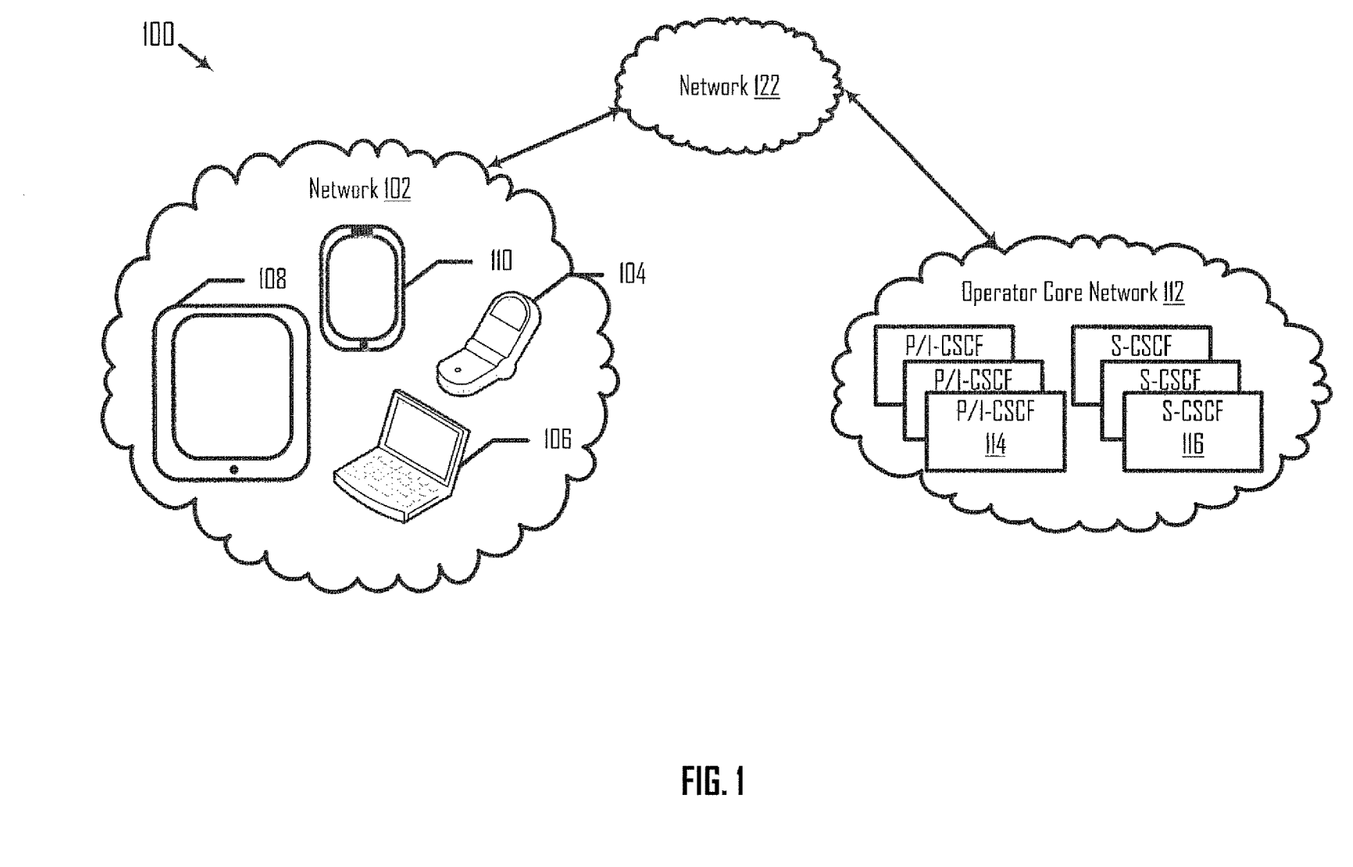
FIG. 1 is a block diagram illustrating a system including a target peer and mobile devices coupled to a network, according to some embodiments.

FIG. 1 is a block diagram illustrating a system 100 including a target peer and mobile devices coupled to a network 102, according to some embodiments.

Network 102 may be, for example, a cellular network. Mobile devices 104, 106, 108, and 110 are coupled to network 102 and may communicate with each other and/or a target peer coupled to network 102. Examples of mobile devices are a smartphone, personal digital assistant (PDA), tablet, and laptop. Other mobile devices are within the scope of the present disclosure.

Network 102 is coupled to an operator core network 112 via a network 122. Network 122 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing. Network 122 may support SIP. In an example, network 122 includes a Long Term Evolution (LTE) network. An LTE network is a wireless broadband technology and has its architecture based on IP.

Operator core network 112 may be used for providing voice services over different network topologies offering IP connectivity. In an example, operator core network 112 may be used for providing voice services over LTE. In an example, operator core network 112 is an IMS network that includes functional entities, such as one or more P/I-CSCFs (proxy/interrogating call state control functions) 114 and one or more S-CSCFs (serving call state control functions) 116. P/I-CSCF 114 may include a proxy call state control function (P-CSCF) and an interrogating CSCF (I-CSCF). Functional entities may constitute applications, deployed on an IP host, with the IP hosts connected to the operator's IP infrastructure. One host may include more than one functional entity and the functional entities may be co-located. P/I-CSCF 114 and S-CSCF 116 may or may not be co-located. Additionally, although the P-CSCF and I-CSCF are depicted as being co-located in the embodiment illustrated in FIG. 1, other embodiments in which the P-CSCF and I-CSCF are not co-located (e.g., reside in different data centers) are within the scope of the disclosure. When functional entities reside in the same computing device, co-location may allow IP messages to take a shorter path.

The P-CSCF may communicate with mobile device 110. In an example, when mobile device 110 sends a signaling message to operator core network 112, the message is sent to a P-CSCF assigned to the mobile device. The P-CSCF may be a unique process running within operator core network 112. When a user connects to operator core network 112, each individual user may be assigned a P-CSCF. As such, a P-CSCF assigned to one mobile device is different from a P-CSCF assigned to another mobile device. The S-CSCF may bridge communications between two P-CSCFs. Information about the end users and any calls may be stored within P-CSCF and S-CSCF. I-CSCF may handle its own specialized functionality.

Figure 2:
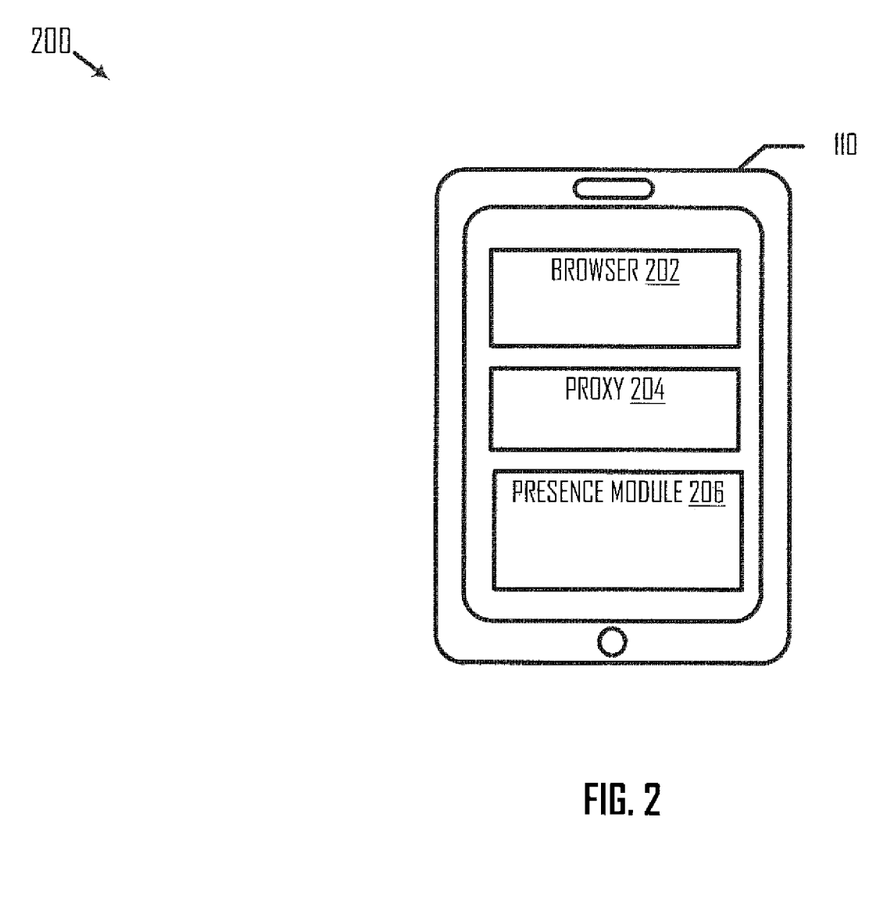
FIG. 2 is a block diagram illustrating a system for facilitating communication between a mobile device and a target peer, according to some embodiments.

FIG. 2 is a block diagram illustrating a system 200 for facilitating communication between a mobile device and a target peer, according to some embodiments. System 200 includes mobile device 110 capable of executing a proxy 204, a presence module 206, and a client application, such as a browser 202. Browser 202 may be capable of accessing and displaying webpages on a display of mobile device 110. Browser 202 may also be capable of voice and video coding and establishing communications in real time with a target application executing on a mobile device.

In an example, browser 202 and the target application are each browsers executing on a mobile device, and the browsers communicate with each other in real-time. In such an example, the user of mobile device 110 may point the browser to a webpage that enables the user to click on an option provided by the webpage to place a call. A user may point the browser to a webpage by, for example, typing a uniform resource location (URL) of the webpage in the address bar of the browser or selecting a hyperlink that causes a server to provide the webpage. The browser may place the call without using a phone line. Rather, the browser may establish a connection over network 122 with a target peer to place the call. In an example, network 122 is the Internet, and browser 202 sets up an IP connection via the Internet to place the call. In some embodiments, browser 202 uses WRTC technology to place the call. Proxy 204 may be used to facilitate the communication between mobile device 110 and the target peer such as to optimize the communication.

Proxy 204 may be coupled to presence module 206. In an example, proxy 204 has presence module 206 as a presence client. Presence module 206 may indicate a status of the user. In an example, the user of mobile device 110 may open browser 202 and communicate with a service to indicate that the user is online and is ready to receive messages from other users.

For brevity, the disclosure may describe client application as being a browser, but this is not intended to be limiting and it should be understood that other client applications are within the scope of the disclosure. Additionally, although proxy 204 has been described as being coupled to presence module 206, other embodiments in which presence module 206 is incorporated into proxy 204 are within the scope of the disclosure.

III. Examples of Leveraging Presence

Example aspects of leveraging presence in the context of WebRTC sessions may include peer availability, peer capability detection, and session configuration. It may be desirable to leverage the functionality of operator core network 112 in leveraging presence.

A. Peer Availability

In some embodiments, proxy 204 (e.g., WebRTC proxy) determines peer availability and improves call setup times. In such embodiments, proxy 204 may leverage RCS presence and presence registration mechanisms already supported by IMS. In an example, proxy 204 leverages the presence capability by blocking block calls or session initiations before they even start.

Figure 3:
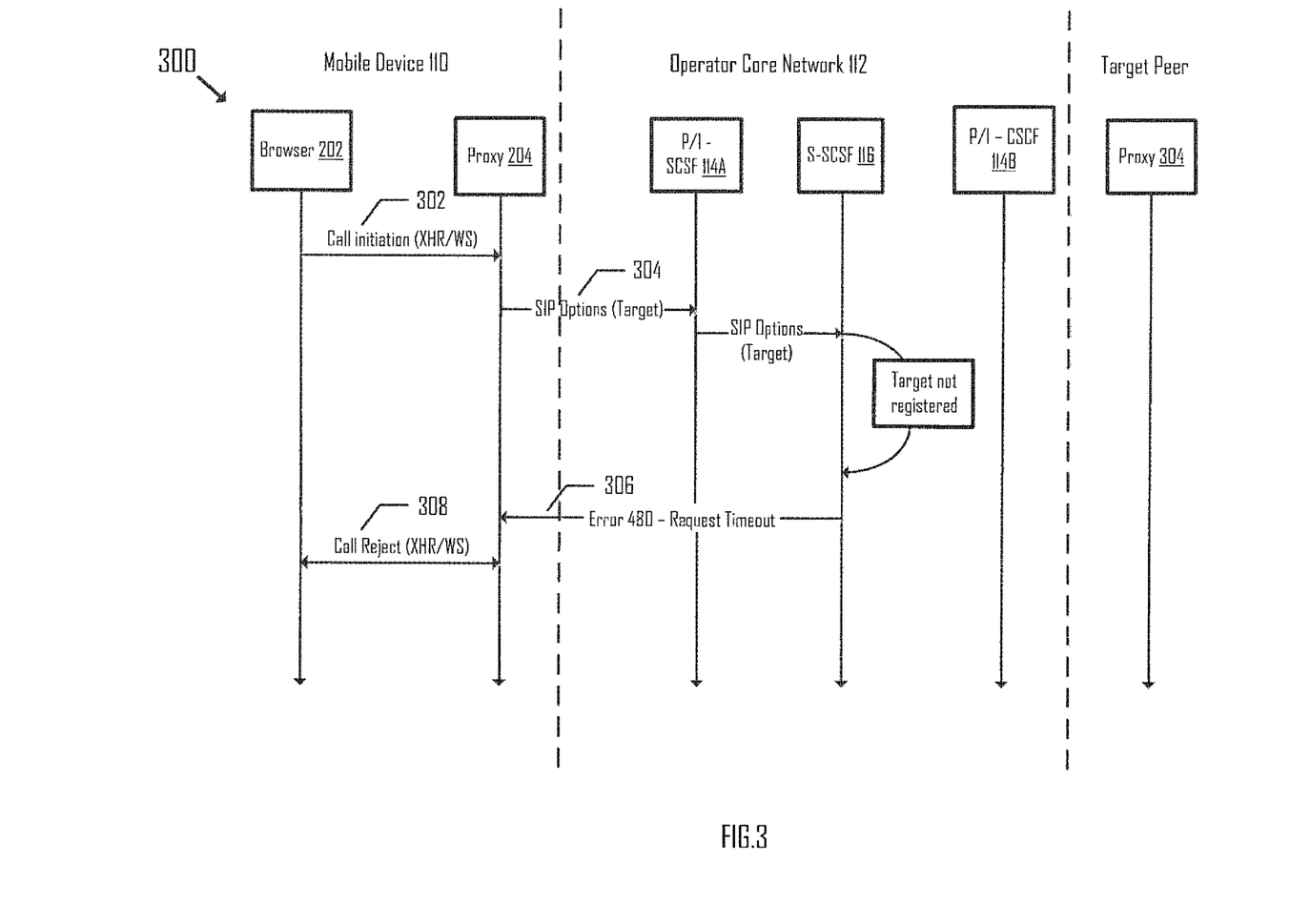
FIG. 3 is a partial call setup signaling diagram illustrating communication facilitation between a mobile device and a target peer, according to some embodiments.

FIG. 3 is a partial call setup signaling diagram 300 illustrating communication facilitation between a mobile device and a target peer, according to some embodiments. Diagram 300 illustrates a sample SIP call flow for a case in which the target peer has not registered with the network.

In FIG. 3, browser 202 may send a communication to initiate a real-time communication connection with a target peer. In an example, the communication is a call initiation (XHR/WS) 302. Proxy 204 may receive the communication sent by browser 202. In an example, browser 202 sends the communication directly to proxy 204. In another example, proxy 204 intercepts the communication to initiate the real-time communication.

Based on the communication to initiate a real-time communication connection with a target peer, proxy 204 may send a communication to a server that causes the server to contact the target peer to determine whether the target peer is online or offline. In an example, proxy 204 sends a SIP options message 304 to operator core network 112. In response, operator core network 112 may relay the message to the target peer to determine whether the target peer is online.

In an example, SIP options message 304 is a query to determine whether the target peer is online. When the user of mobile device 110 opens browser 202, it may register with operator core network 112 and P/I-CSCF 114A may be assigned to mobile device 110. Operator core network 112 may or may not be able to reach the target peer. In an example, the SIP options message is sent from mobile device 110 to P/I-CSCF 114A. P/I-CSCF 114A may send SIP options message 304 to S-SCSF 116, which may determine that the target peer is not registered with operator core network 112. In FIG. 3, no P/I-CSCF is assigned to the target peer.

In an example, if operator core network 112 is unable to reach the target peer, operator core network 112 may send a message back to proxy 204 indicating that the target peer is not reachable. In another example, proxy 204 receives an Error 480—Request Timeout 306 and determines, based on the error message, that the target peer is not reachable.

As discussed, a target peer may not be reachable if the target peer is not registered with the operator core network 112 (e.g., IMS network). Proxy 204 may send browser 202 a Call Reject (XHR/WS) message to indicate to browser 202 that call initiation (XHR/WS) 302 was unsuccessful. An advantage of an embodiment of the proxy may allow messages (e.g., call initiation messages) to be rejected without the overhead of multiple message exchanges. Accordingly, no additional communications may go over the air as far as a formal call of rejection from the network. As such, proxy 204 may block calls or session initiations before they even start.

B. Peer Capability Detection

In some embodiments, proxy 204 determines peer capabilities of the target peer. In an example, proxy 204 may initiating a session with the target peer, where the session based on the one or more determined capabilities of the target peer.

Figure 4:
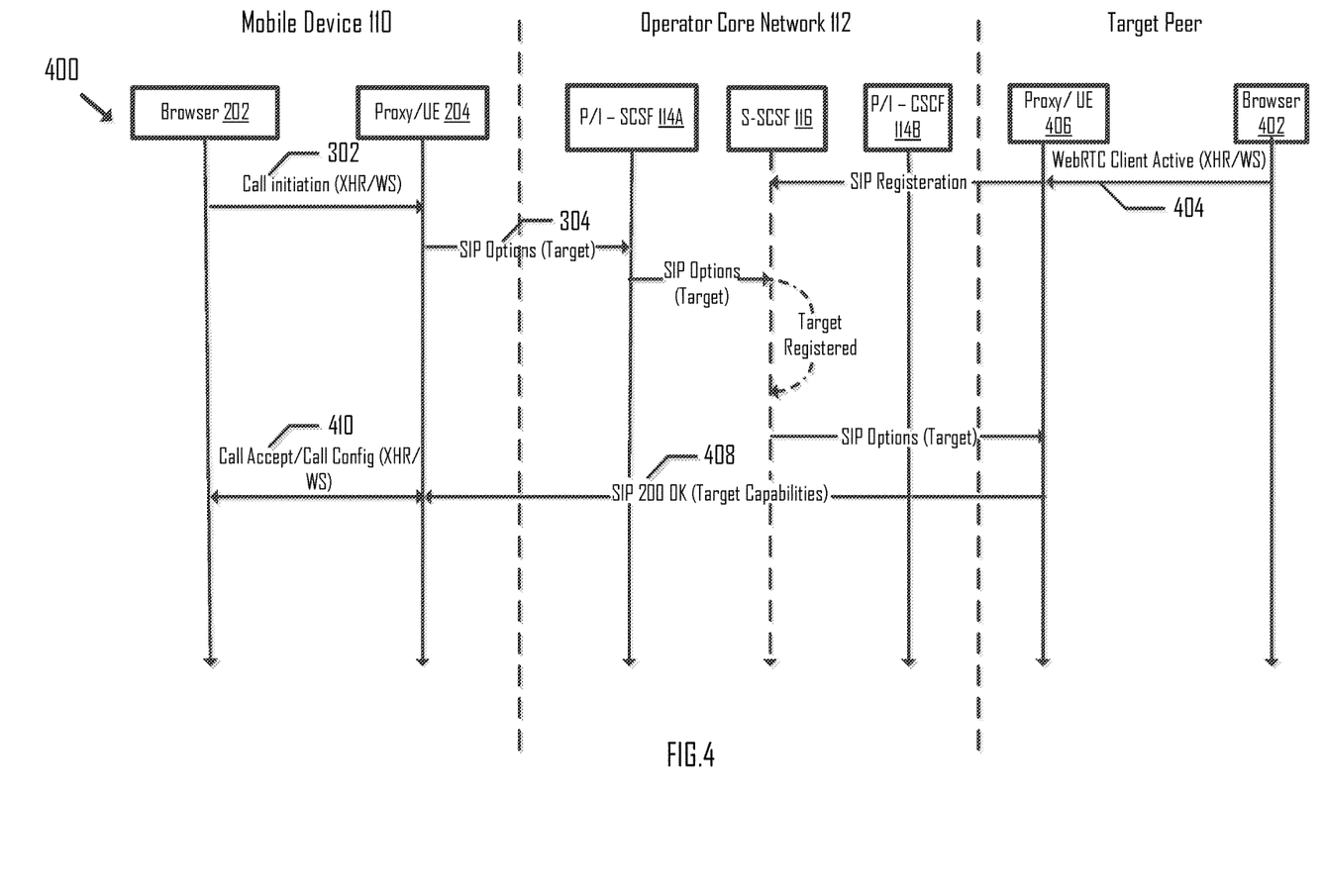
FIG. 4 is a partial call setup signaling diagram illustrating communication facilitation between a mobile device and a target peer, according to some embodiments.

FIG. 4 is a partial call setup signaling diagram 400 illustrating communication facilitation between a mobile device and a target peer, according to some embodiments. Diagram 400 illustrates a sample SIP call flow for a case in which the target peer has registered with operator core network 112.

In FIG. 4, a browser 402 and a proxy 406 may execute on the target peer. Proxy 406 executing on the target peer may be similar to or the same as proxy 204. In an example, a user of the target peer opens an application (e.g., browser 402) that sends a WEBRTC Client Active (XHR/WS) call 404 that is received by proxy 406. WEBRTC Client Active (XHR/WS) call 404 may indicate that the target peer is active or reachable and based on WEBRTC Client Active (XHR/WS) call 404, proxy 406 may register the target peer with operator core network 112. P/I-CSCF 114B may be assigned to the target peer when it registers with operator core network 112. When the target peer registers with operator core network 112, the target peer may register its capabilities with operator core network 112. Other mobile devices may advertise their capabilities by registering with operator core network 112.

Messages 302 and 304 were described in reference to FIG. 3. In FIG. 4, because the target peer has registered, S-SCSF 116 may send SIP Options (Target) call 304 to P/I-CSCF 114B, which then sends SIP options message 304 to proxy 406 at the target peer. SIP options message 304 may be a query to determine the registered target peer's capabilities. In an example, in-band peer capability detection is possible when a proxy leverages RCS presence.

Proxy 406 may respond to mobile device 110 with a SIP 200 OK (Target Capabilities) call 408, which may include information about the target peer's capabilities. In an example, call 408 conveys information about the current state of browser 402 (e.g., whether a WebRTC session is active in browser 402) in addition to other client capabilities that may be conveyed via, for example, embedded Session Description Protocol (SDP) fields (e.g., whether codecs are supported). To convey WebRTC capabilities, SIP may provide different extensibility mechanisms. In an example, SIP extension headers are used to convey WebRTC capabilities, such as IMS-specific p-headers (e.g., "P-WebRTC-Proxy-Enabled). Additionally, SDP message bodies carried via SIP transport may be extensible via an Internet Assigned Numbers Authority (IANA) registry. These are merely examples and other protocols may be used.

Example indications of capabilities may include whether the target peer is enabled with a WebRTC proxy, whether the target peer has a WebRTC webpage open in browser 402, whether the target peer handles WebRTC calls through browser 402 (or any other application), and whether the target peer has an application capable of taking voice and/or video calls in the absence of WebRTC or browser 402. Proxy 204 may receive call 408 and forward a message Call Accept/Call Config (XHR/WS) 410 to indicate to browser 202 that the call initiation to initiate a real-time communication connection with the target peer was successful.

Proxy 204 may make decisions based on the capabilities of the target peer. In an example, if proxy 204 determines that the target peer does not have a WebRTC webpage open in browser 402, proxy 204 may instruct an application executing on the target peer to open up a particular web page. In such an example, proxy 204 may determine whether the target peer is browsing a web page and whether a web page is currently open that can receive a WebRTC call. If there is not currently a web page that is open that can receive a WebRTC call, proxy 204 may send a message to proxy 406 to wake up and point browser 402 on the target peer to a specific web address (e.g., a Hypertext Transfer Protocol (HTTP) address). If browser 402 executing on the target peer performs the instructed actions, a WebRTC session may be initiated, even though the target peer did not initially have a WebRTC compatible web page open.

It may be a security issue to allow an application to instruct a browser running on a different device to point to a specific web address. In another example, proxy 406 running on the target peer may send a message to proxy 204 indicating that proxy 406 cannot instruct browser 402 to point to that specific web address. Proxy 204 may then, for example, proceed to initiate a Voice over LTE (VoLTE) call by routing a call to the target peer's VoLTE client rather than the target peer's browser. In another example, proxy 204 may instruct an application executing on the target peer that is not a browser and can communicate in a WebRTC session to open. The instructed application may be an application that the user of the target peer downloaded over a network from, for example, an application store.

In another example, if a user of mobile device 110 uses a WebRTC session to send media (e.g., audio and/or video) to the target peer, proxy 204 may be able to determine whether the target peer supports the format in which the user wants to send the message. If the user wants to send a video in the MPEG-4 format and the target peer only accepts the H.264 format, proxy 204 may perform an action based on determining that the target peer does not support the intended format. Accordingly, proxy 204 may leverage the presence of the target peer such that before the user of mobile device 110 sends the video, software running on mobile device 110 may already have detected the presence of the target peer and knows its capabilities. Proxy 204 may send a message to browser 202 to display to the user, where the message indicates to the user that the target peer does not accept the intended format.

Referring back to the example in FIG. 3 in which the target peer was not registered and the initiation call was not completed through operator core network 112, proxy 204 may block the call or session initiations before they even start. In some embodiments, proxy 204 may perform further actions, based on the capabilities of the target peer, when the target peer is determined to be unreachable. For example, proxy 204 may know that the target peer has a regular voice client and may load that information to route a call to the voice client. In another example, if proxy 204 determines that the target peer does not accept the intended format that the user of mobile device 110 wants to send, proxy 204 may transcode the media (e.g., audio and/or video) into a format that is compatible with the target peer to be sent to the target peer.

In another example, proxy 204 may determine whether the target peer has a WebRTC session currently active in the target peer's browser and perform an action based on that determination. In an example, if the target peer has a WebRTC session currently active in the target peer's browser, proxy 204 may communicate with the target peer's browser through the use of out-of-band signaling via an external server. Accordingly, proxy 204 may request the target peer to activate its local proxy and register with operator core network 112. The originator peer may also proceed with the call without leveraging the operator core network 112. In another example, proxy 204 may wake up the target peer through the use of out-of-band signaling via an external server coupled with a push mechanism. The activated target peer may be triggered to initiate a browser session using the desired WebRTC application and communicate with the target proxy to register with operator core network 112.

In an embodiment, proxy 204 caches the information returned in call 408. Proxy 204 may cache the capabilities of the target peer and use them for reference in the future. In an example, proxy 204 uses the cached information to initiate a session with the target peer, where the session is based on the one or more determined cached capabilities of the target peer. In an example, proxy 204 rejects calls based on the cached information that the target peer does not have a particular capability (e.g., support an intended format). This is not intended to be limiting, and other examples in which proxy 204 uses its cached information are also possible.

C. Session Configuration

Proxy 204 may leverage cached capabilities of a target to configure a session while avoiding any over-the-air messaging. Proxy 204 may leverage presence-derived knowledge about the status of the target peer's browser (and presence of a WebRTC proxy) to also forward a call directly to a VoLTE client. This may occur if, for example, the target peer is detected to be registered but does not indicate the presence of a WebRTC proxy.

Figure 5:
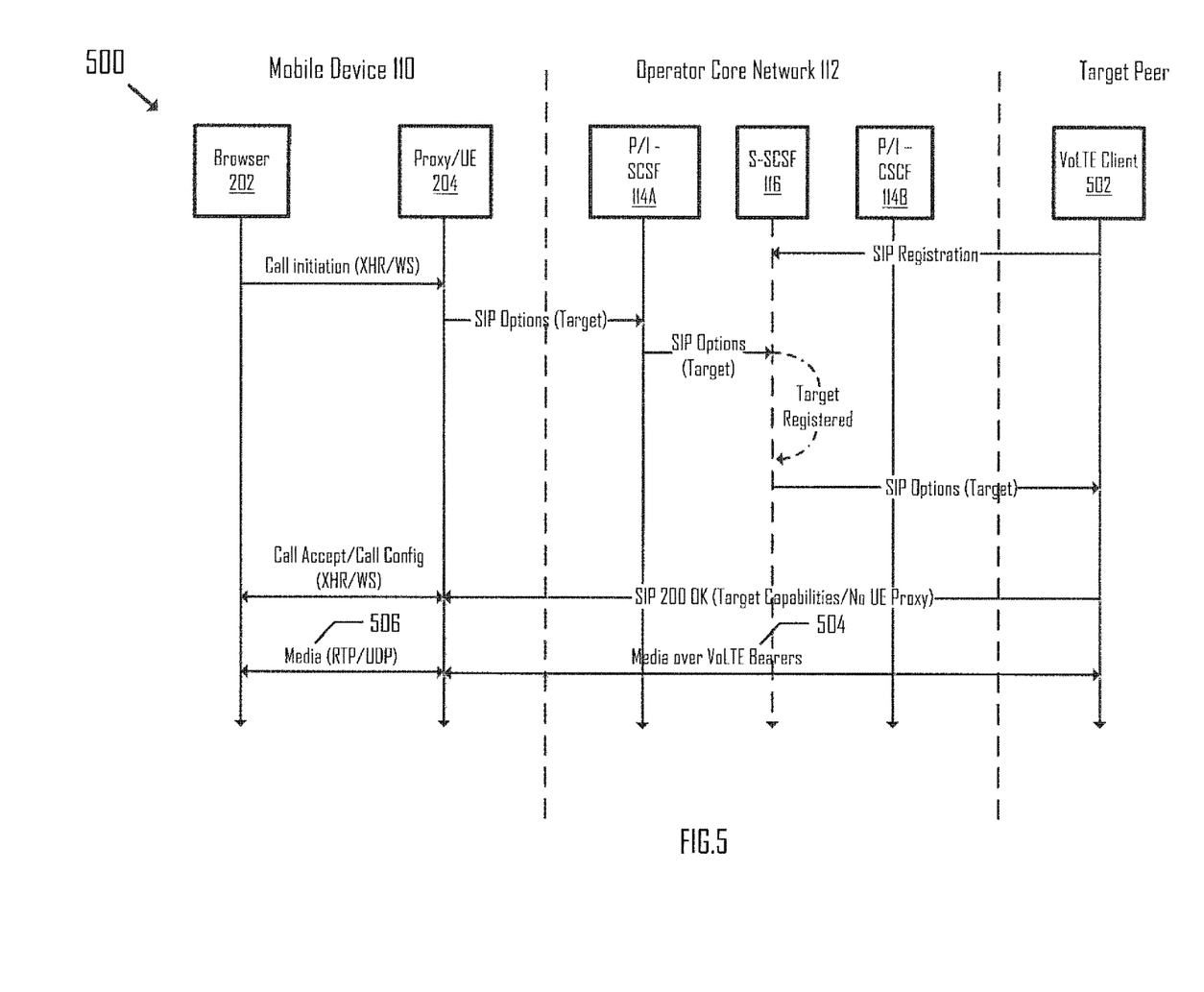
FIG. 5 is a partial call setup signaling diagram illustrating communication facilitation between a mobile device and a target peer, according to some embodiments.

FIG. 5 is a partial call setup signaling diagram 500 illustrating communication facilitation between a mobile device and a target peer, according to some embodiments. In diagram 500, the target peer does not have a WebRTC proxy but is registered through its VoLTE/IMS client 502. Proxy 204 may transparently map media to and from the browser to VoLTE bearers. Media over VoLTE Bearers 504 may be transmitted between proxy 204 and VoLTE/IMS client 502. Additionally, media (RTP/UDP) messages 506 may be transmitted between browser 202 and proxy 204.

In an embodiment, proxy 204 determines whether the target peer is using a target proxy for real-time communications. When it is determined that the target peer is not using a target proxy for real-time communications, proxy 204 initiates a real-time communications session with the target peer using an alternative method for real-time communications. In an example, proxy 204 may initiate the real-time communications session with the target peer using an alternative method for real-time communications by routing the session through the target proxy over a voice-over-LTE connection. In another example, when it is determined that the target peer is using a target proxy for real-time communications, proxy 204 may initiate a real-time communications session with the target peer using an alternative method for real-time communications. Proxy 204 may initiate the real-time communications session using the alternative method because, for example, proxy 204 determines that the alternative method is faster for real-time communications. For example, proxy 204 may determine that it is faster to route the session through the target proxy over a voice-over-LTE connection.

In another example, when it is determined that the target peer is using the target proxy for real-time communications, proxy 204 determines whether the target peer has an active real-time communications session. When it is determined that the target peer has an active real-time communications session, proxy 204 triggers a message to be sent to the target peer to cause the target peer to initiate the real-time communications session. For example, the message may cause the target peer to open a browser to a pre-determined URL on the target peer.

As discussed above and further emphasized here, FIGS. 1-5 are merely examples, which should not unduly limit the scope of the claims. For example, the presence has been described as using a presence-on-demand technique. Different types of presence may be in leveraged in proxy 204.

IV. Presence Server

In another example, a presence server is used to determine presence. In such an example, a user of mobile device 110 may open a client application and register with a presence server that has information on the user of mobile device 110 and contacts the user to determine whether the user is still online. Accordingly, the presence server and user may periodically "keep alive" that connection.

Figure 6:
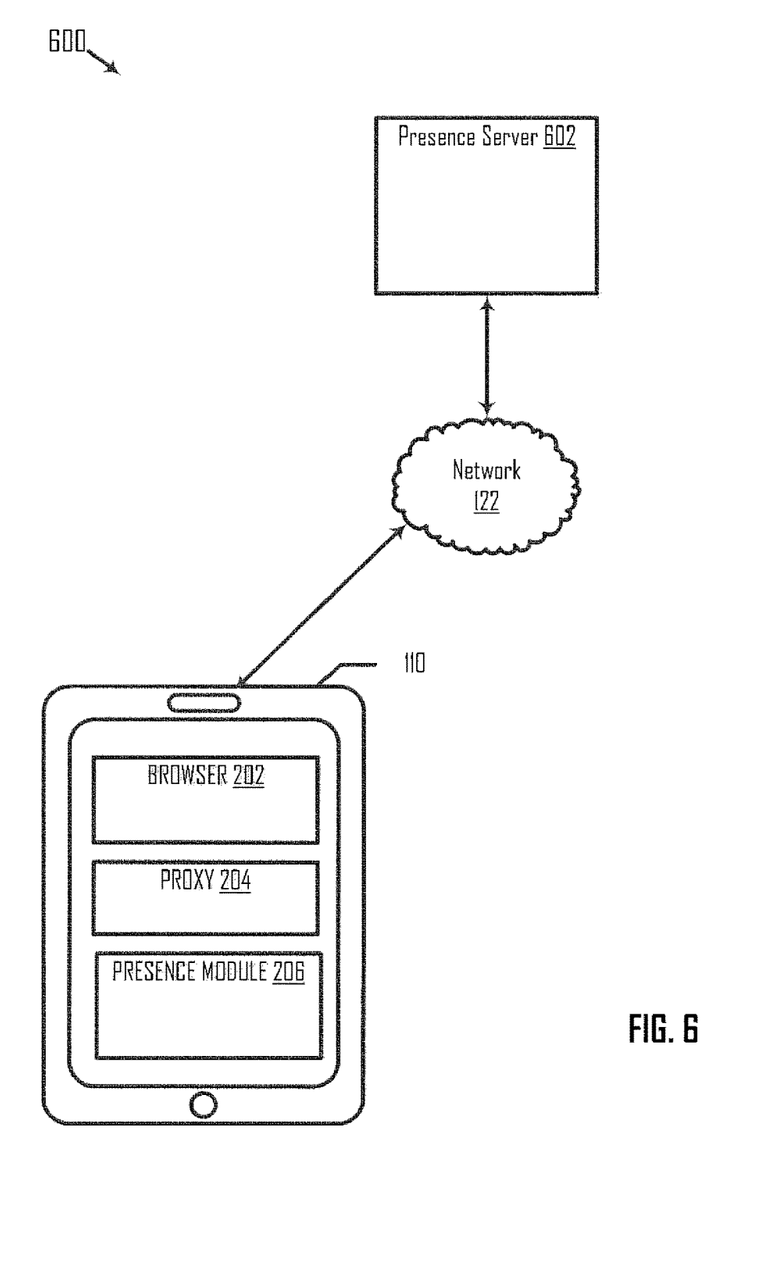
FIG. 6 is a block diagram illustrating a system for facilitating communication between a mobile device and a target peer, according to some embodiments.

FIG. 6 is a block diagram illustrating a system 600 for facilitating communication between a mobile device and a target peer, according to some embodiments. System 600 includes mobile device 110 and presence server 602 coupled over network 122. Proxy 204 may communicate with presence server 602 over network 122. Presence server 602 may store the information discussed above (e.g., peer availability, peer capabilities, and session configuration) and enable a user to register with it.

In an example, proxy 204 may send queries to presence server 602 to obtain information regarding peer availability, peer capabilities, and/or session configuration from presence server 602 without using SIP messaging. In such an example, proxy 204 does not need to send call initiation (XHR/WS) 302 to determine whether the target peer is registered.

III. Example Method

Figure 7:
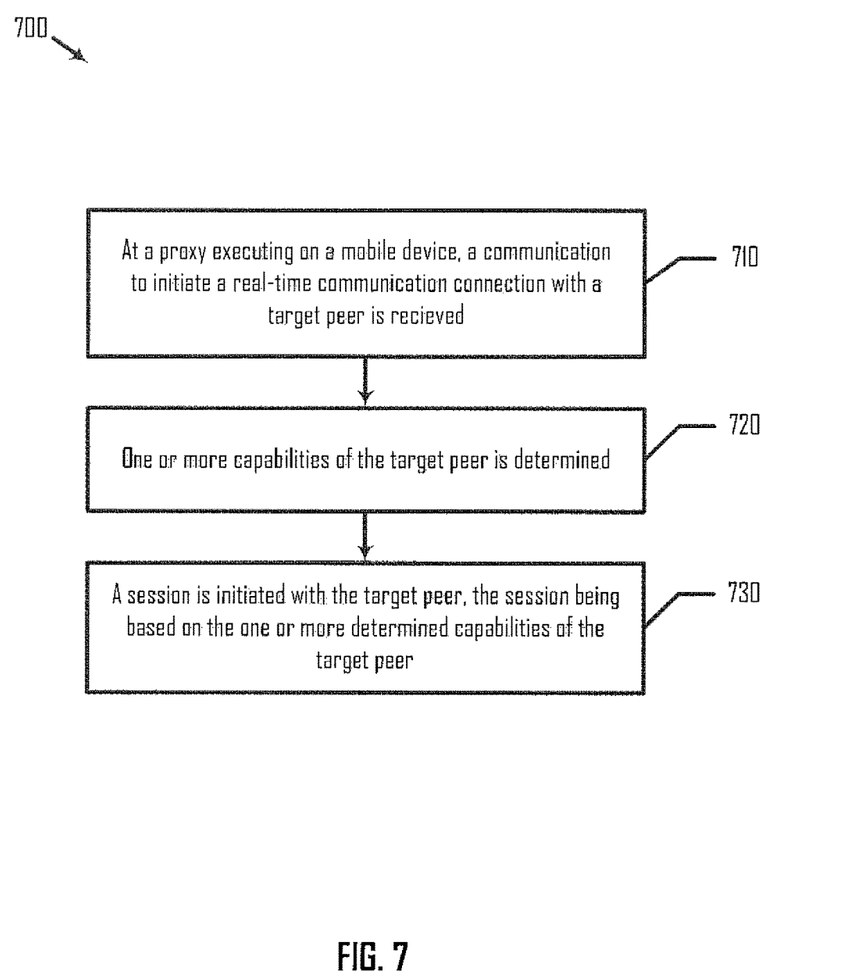
FIG. 7 is a simplified flowchart illustrating a method for facilitating communication between a mobile device and a target peer, according to some embodiments.

FIG. 7 is a simplified flowchart illustrating a method 700 for facilitating communication between a mobile device and a target peer, according to some embodiments. Method 700 is not meant to be limiting and may be used in other applications.

Method 700 includes blocks 710-730. In a block 710, At a proxy executing on a mobile device, a communication to initiate a real-time communication connection with a target peer is received. In an example, proxy 204 executing on mobile device 110 receives a communication to initiate a real-time communication connection with a target peer.

In a block 420, one or more capabilities of the target peer is determined. In an example, proxy 204 determines one or more capabilities of the target peer. In a block 430, a session is initiated with the target peer, the session being based on the one or more determined capabilities of the target peer. In an example, proxy 204 initiates a session with the target peer, the session being based on the one or more determined capabilities of the target peer.

It is also understood that additional processes may be performed before, during, or after blocks 710-730 discussed above. It is also understood that one or more of the blocks of method 700 described herein may be omitted, combined, or performed in a different sequence as desired IV. Example Wireless Device FIG. 8 is a block diagram illustrating a wireless device 800 including a digital signal processor, according to some embodiments. Wireless device 800 includes a processor, such as a digital signal processor (DSP) 801 to process a plurality of instructions to facilitate communication between wireless device 800 positioned within an internal network and a target peer, where the internal network is separated from one or more external networks by NAT. In an example, DSP 801 processes instructions according to method 700. Mobile device 110 may be implemented as wireless device 800.

FIG. 8 also shows a display controller 830 that is coupled to DSP 801 and to a display 832. A coder/decoder (CODEC) 834 may also be coupled to DSP 801. A speaker 836 and a microphone 838 may be coupled to CODEC 834. Additionally, a wireless controller 840 may be coupled to DSP 801 and to a wireless antenna 848. In some embodiments, DSP 801, display controller 830, memory 850, CODEC 834, and wireless controller 840 are included in a system-in-package or system-on-chip device 856.

In some embodiments, input device 831 and a power supply 860 are coupled to system-on-chip device 856. Moreover, in some embodiments, as illustrated in FIG. 8, display 832, input device 831, speaker 836, microphone 838, wireless antenna 848, and power supply 860 are external to system-on-chip device 856. Each of display 832, input device 831, speaker 836, microphone 838, wireless antenna 848, and power supply 860 may be coupled to a component of system-on-chip device 856, such as an interface or a controller. The user of wireless device may communicate with another user by speaking into microphone 838 or seeing the other user via display 832.

Those of skill would further appreciate that the various illustrative logical blocks, configurations, modules, circuits, and steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims. Thus, the present disclosure is limited only by the claims.

What is claimed is:

1. A method of facilitating communication between a mobile device and a target peer, the method comprising:
   receiving, at a proxy executing on a mobile device, a communication to initiate a real-time communication connection with a target peer, the communication sent from a client application executing on the mobile device, and the target peer remote from the mobile device;
   before initiating, by the proxy, a session with the target peer:
      determining, at the proxy, whether the target peer is registered with an operator core network; and
      determining, at the proxy, one or more capabilities of the target peer, the target peer's one or more capabilities registered with the operator core network; and
   initiating, at the proxy, the session with the target peer, the session being based on the one or more determined capabilities of the target peer and further based on whether the target peer is registered with the operator core network.

2. The method of claim 1, wherein the client application is a browser.

3. The method of claim 1, further comprising:
   detecting, at the proxy, a presence of the target peer on the operator core network.

4. The method of claim 3, wherein detecting the presence includes:
   sending a communication to determine whether the target peer is online; and
   receiving a response indicating that the target peer is online, wherein detecting the presence of the target peer on the operator core network occurs before initiating the session with the target peer.

5. The method of claim 4, wherein the sending a communication to determine whether the target peer is online includes sending a communication to a server that causes the server to contact the target peer to determine whether the target peer is online.

6. The method of claim 1, further comprising:
   determining, at the mobile device, whether the target peer is using a target proxy for real-time communications.

7. The method of claim 6, further comprising:
   when it is determined that the target peer is using the target proxy for real-time communications, initiating a real-time communications session with the target peer using an alternative method for real-time communications.

8. The method of claim 6, further comprising:
   when it is determined that the target peer is not using the target proxy for real-time communications, initiating a real-time communications session with the target peer using an alternative method for real-time communications.

9. The method of claim 8, wherein the initiating a real-time communications session with the target peer using an alternative method for real-time communications includes routing the session through the target proxy over a voice-over-LTE connection.

10. The method of claim 6, further comprising:
    when it is determined that the target peer is using the target proxy for real-time communications, determining whether the target peer has an active real-time communications session; and
    when it is determined that the target peer has the active real-time communications session, triggering a message to be sent to the target peer to cause the target peer to initiate the real-time communications session.

11. The method of claim 10, wherein the message causes the target peer to open a browser to a pre-determined URL on the target peer.

12. The method of claim 1, wherein determining one or more capabilities of the target peer further includes:
    sending a Session Initiation Protocol (SIP) request for the target peer's one or more capabilities to the target peer; and
    receiving a SIP response including the target peer's one or more capabilities.

13. The method of claim 1, further comprising:
    storing the one or more capabilities of the target peer into a cache;
    receiving, at the proxy, a second communication to initiate second a real-time communication connection with the target peer, the second communication sent from the client application;
    after receiving the second communication, determining, at the proxy, that the target peer is registered with the operator core network;
    retrieving, at the proxy, the target peer's one or more capabilities from the cache;

initiating a second session with the target peer after retrieving the target peer's one or more capabilities from the cache, the second session being based on the target peer's one or more capabilities from the cache.

14. The method of claim 1, further comprising:
rejecting, based on determining that the target peer's one or more cached capabilities does not include a first capability, one or more communications to initiate a real-time communication connection with the target peer.

15. A system for facilitating communication between a mobile device and a target peer, the system comprising:
a communication module executable on a mobile device, wherein the communication module receives a communication to initiate a real-time communication connection with a target peer, the communication sent from a client application executing on the mobile device, and the target peer remote from the mobile device; and
a capability module executable on the mobile device, wherein before a session is initiated with the target peer, the capability module determines whether the target peer is registered with an operator core network and determines one or more capabilities of the target peer, and wherein the capability module initiates the session with the target peer, wherein the session is based on the one or more determined capabilities of the target peer and further based on whether the target peer is registered with the operator core network, and the target peer's one or more capabilities are registered with the operator core network.

16. The system of claim 15, wherein the communication module receives the communication from a client application executing on the mobile device, wherein the client application is a browser, and wherein the mobile device is a smartphone, tablet, laptop, or personal digital assistant.

17. The system of claim 15, wherein the capability module determines whether the target peer is using a target proxy for real-time communications.

18. The system of claim 17, wherein when it is determined that the target peer is not using the target proxy for real-time communications, the capability module initiates a real-time communications session with the target peer using an alternative method for real-time communications.

19. The system of claim 18, wherein the mobile device is coupled to an LTE cellular network, and when it is determined that the target peer is not using the target proxy for real-time communications, the capability routes the session through the target proxy over a voice-over-LTE connection.

20. A non-transitory computer-readable medium having stored thereon computer-executable instructions for performing operations, comprising:
receiving, at a proxy executing on a mobile device, a communication to initiate a real-time communication connection with a target peer, the communication sent from a client application executing on the mobile device;
determining, at the proxy, that the target peer is registered with an operator core network;
determining one or more capabilities of the target peer, the target peer's one or more capabilities registered with the operator core network; and
initiating a session with the target peer after determining the one or more capabilities of the target peer, the session being based on the one or more determined capabilities of the target peer.

21. An apparatus for facilitating communication between a mobile device and a target peer, the apparatus comprising:
means for receiving a communication to initiate a real-time communication connection with a target peer, the communication sent from a client application executing on the mobile device, and the target peer remote from the mobile device;
before initiating a session with the target peer:
means for determining whether the target peer is registered with an operator core network; and
means for determining one or more capabilities of the target peer, the target peer's one or more capabilities registered with the operator core network; and
means for initiating the session with the target peer, the session being based on the one or more determined capabilities of the target peer and further based on whether the target peer is registered with the operator core network.

* * * * *